United States Patent
Tugnoli

[11] Patent Number: 5,584,354
[45] Date of Patent: Dec. 17, 1996

[54] HAND TRUCK FOR TRANSPORTING HEAVY MACHINERY

[75] Inventor: Dino Tugnoli, Bologna, Italy

[73] Assignee: TU.TA S.R.L., Bologna, Italy

[21] Appl. No.: 380,069

[22] Filed: Jan. 30, 1995

[30] Foreign Application Priority Data

Jan. 28, 1994 [IT] Italy .................. B094A0029

[51] Int. Cl.⁶ .......................................... B62D 51/04
[52] U.S. Cl. .................. 180/19.1; 280/43.12; 414/467
[58] Field of Search ................... 180/19.1, 19.2, 180/19.3; 280/43.12; 414/467

[56] References Cited

U.S. PATENT DOCUMENTS

| | | | |
|---|---|---|---|
| 1,355,910 | 10/1920 | Reinberger | 280/28.5 |
| 2,550,548 | 4/1951 | Framhein | 280/43.12 |
| 2,855,061 | 10/1958 | Lilienthal | 180/19.1 |
| 3,246,713 | 4/1966 | Nichols | 280/43.12 |
| 3,261,617 | 7/1966 | Becker et al. | 280/43.12 |
| 3,557,893 | 1/1971 | Kohls | 180/19.3 X |
| 3,967,257 | 6/1976 | Harron | 280/43.12 |
| 4,669,561 | 6/1987 | Sheen | 180/19.1 |
| 5,056,981 | 10/1991 | Knowles | 180/19.1 X |

FOREIGN PATENT DOCUMENTS

| | | | |
|---|---|---|---|
| 2088184 | 9/1993 | France . | |
| 87991 | 7/1956 | Norway | 280/43.12 |
| 107293 | 7/1917 | United Kingdom . | |

*Primary Examiner*—Eric D. Culbreth
*Assistant Examiner*—F. Zeender
*Attorney, Agent, or Firm*—Ladas & Parry

[57] ABSTRACT

A hand truck for transporting heavy machinery such as printing presses or machine tools of any type. The truck includes a bed having a number of revolving rollers by which the bed rests on the floor. A platform is supported on the bed for rotation around a vertical axis, and on which the machine rests. A drive unit is mounted on the bed and controls rotation of the rollers and hence travel of the truck. A steering device controls the travel direction of the truck and a control unit on the steering device controls the drive unit.

10 Claims, 3 Drawing Sheets

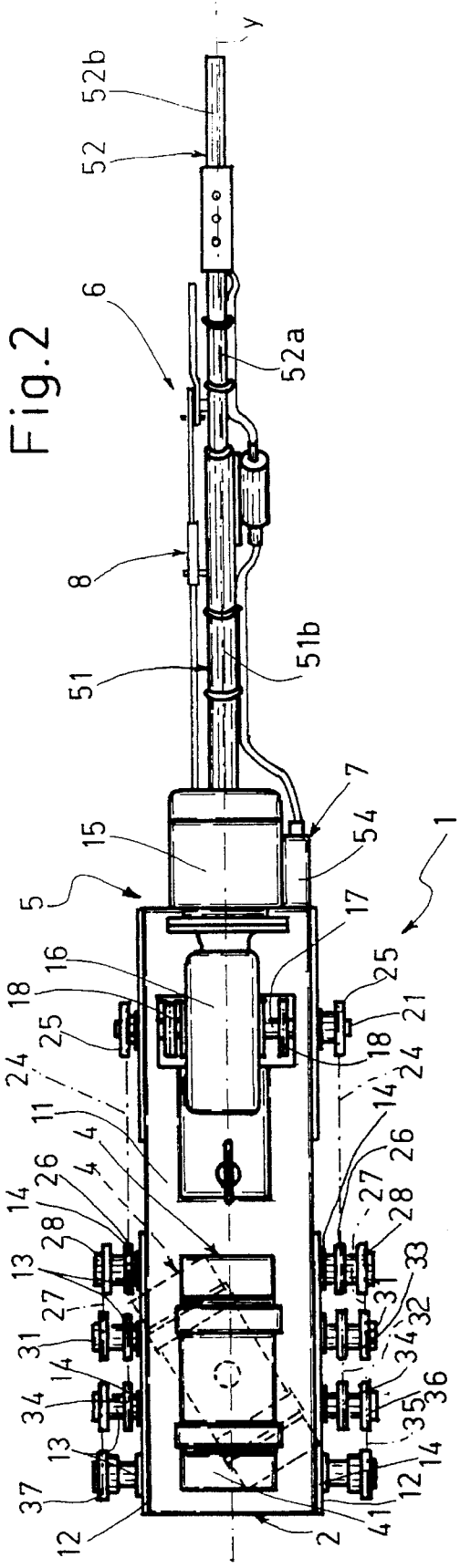
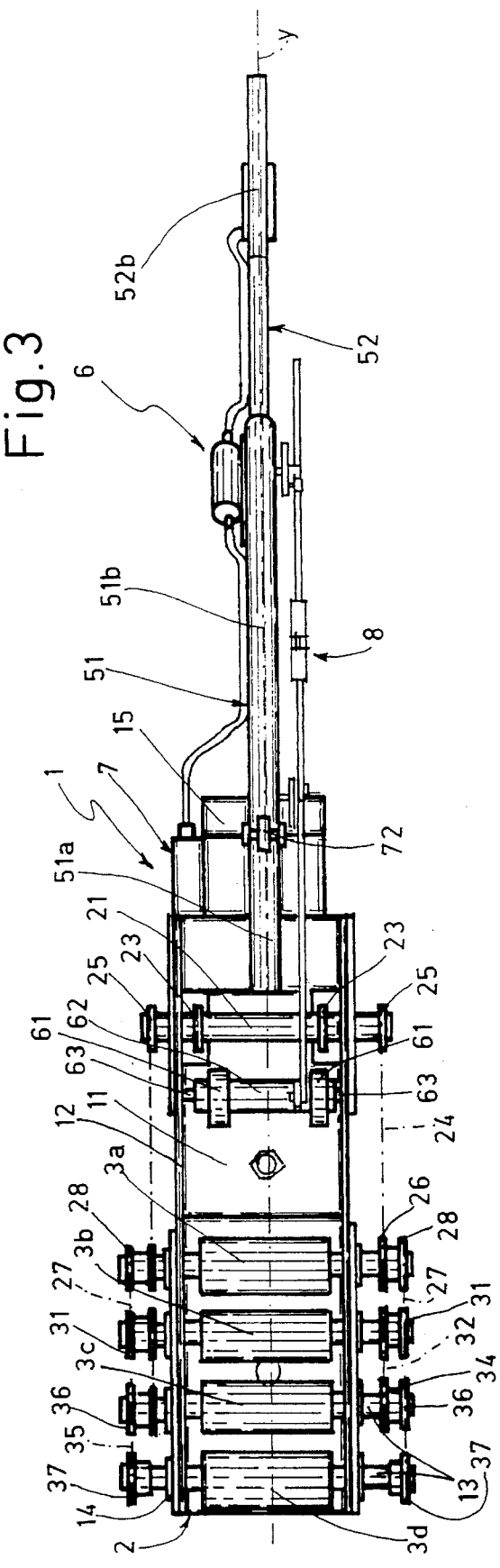

HAND TRUCK FOR TRANSPORTING HEAVY MACHINERY

BACKGROUND OF THE INVENTION

The present invention relates to a hand truck for transporting heavy machinery.

As is known, heavy machinery is transferred from one part to another of an industrial plant using floor-mounted rollers on to which the machine is loaded and pushed by hand.

SUMMARY OF THE INVENTION

It is an object of the present invention to provide a hand truck enabling heavy machinery to be transported easily, with relatively little effort on the part of the user.

Further objects aims and advantages of the present invention will be disclosed in the following description.

According to the present invention, there is provided a hand truck for transporting heavy machinery such as printing presses or machine tools of any type; characterized in that it comprises:

- a bed for supporting the machine and including a number of revolving rollers by which the bed it rests on the floor;
- drive means fitted to the bed, and for controlling rotation of said rollers and hence travel of the truck;
- a steering device for controlling the travel direction of the truck; and
- means for controlling said drive means.

BRIEF DESCRIPTION OF THE DRAWINGS

A preferred, non-limiting embodiment of the present invention will be described by way of example with reference to the accompanying drawings, in which:

FIGS. 2 and 3 show top and bottom plan views respectively of the FIG. 1 truck;

DETAILED DESCRIPTION OF THE INVENTION

Figure 1:
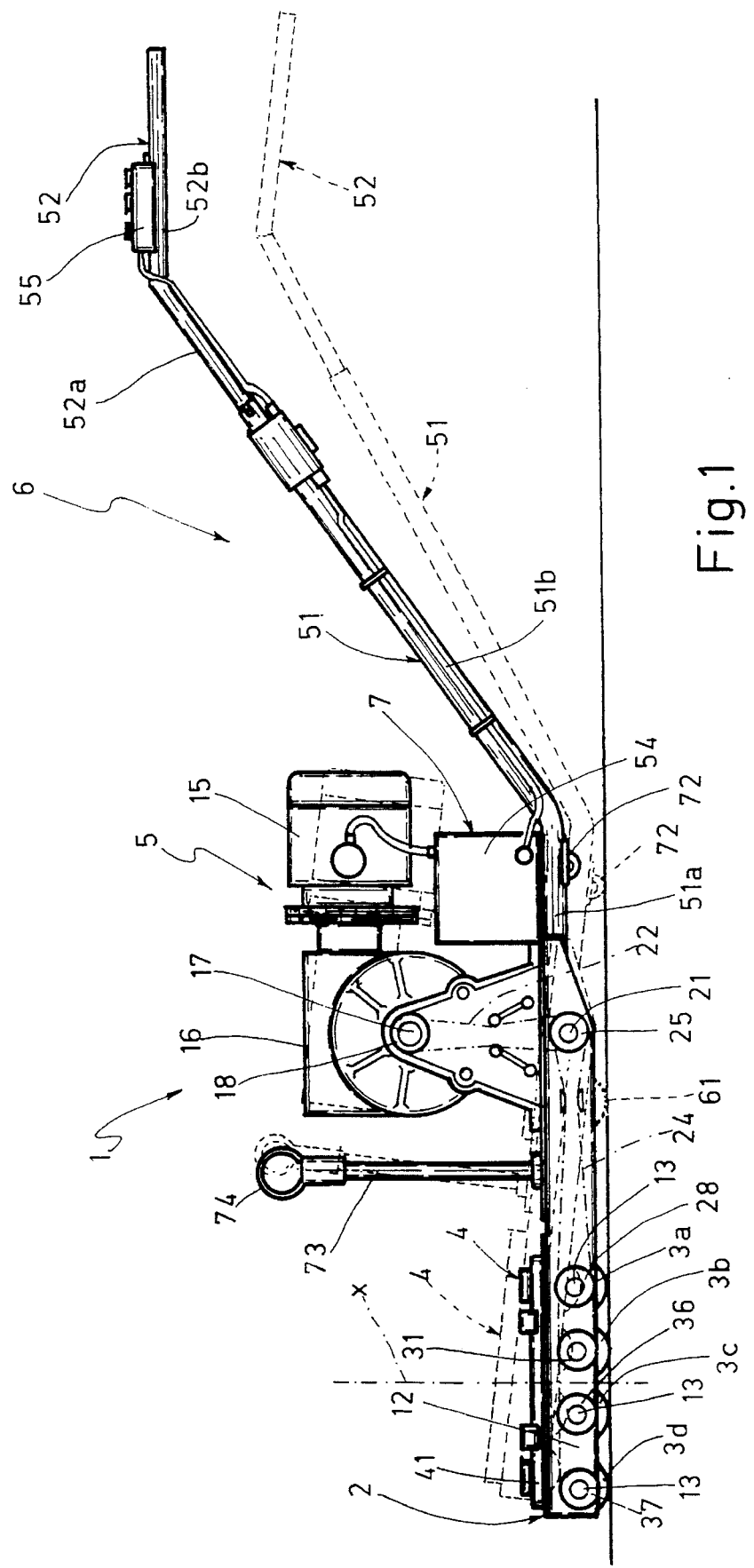
FIG. 1 shows a side view of a hand truck in accordance with the teachings of the present invention.

Number 1 in FIGS. 1, 2 and 3 indicates a hand truck for transporting heavy machinery (not shown) such as printing presses or machine tools of any type.

Truck 1 comprises:

- a bed 2 having four revolving rollers 3a, 3b, 3c, 3d by which it rests on the floor;
- a platform 4 supported on bed 2, for rotating about a vertical axis X, and on which the machine rests;
- drive means 5 fitted to bed 2, and for controlling rotation of rollers 3a, 3b, 3c, 3d and hence travel of truck 1;
- a steering device 6 for controlling the travel direction of truck 1; and
- means 7 for controlling drive means 5.

Truck 1 also comprises a system 8 for manually operating truck 1 when it is unloaded.

With reference to FIGS. 1, 2 and 3, bed 2 comprises a horizontal, substantially rectangular wall 11; and two small lateral walls 12 extending downwards from the longer sides of wall 11 which, for a clear understanding of truck 1, may be divided into a front portion, a small central portion, and a rear portion. The front portion of wall 11 is fitted underneath with rollers 3a, 3b, 3c, 3d, which rest on the floor, are fitted horizontally and successively as of the central portion of bed 2, are shorter than the distance between walls 12, and are fitted to respective hubs 13 extending beyond walls 12. Hubs 13 are fitted through and supported on walls 12 by means of ordinary bushes 14; and the size of walls 12, the outside diameter of rollers 3a, 3b, 3c, 3d, and the location of hubs 13 in relation to walls 12 are such as to prevent rollers 3a, 3b, 3c, 3d from contacting the bottom face of wall 11 at the top, and the bottom edge of walls 12 from contacting the floor. Rollers 3a, 3b, 3c, 3d are preferably made of nylon or Teflon.

With reference to FIGS. 1 and 2, drive means 5 is supported on the rear portion of bed 2, and comprise a preferably electric motor 15, and a motor reducer 16 for transmitting drive from the output shaft of motor 15 to a horizontal shaft 17 perpendicular to the longitudinal axis Y of bed 2. Parallel to shaft 17 and beneath wall 11, walls 12 support a rotary shaft 21, the axial ends of which extend beyond walls 12. The output shaft of motor 15 drives rollers 3a, 3b, 3c, 3d by means of two transmission systems, which are perfectly symmetrical in relation to axis Y, and the components of which are therefore indicated using the same numbering system.

Each transmission system comprises:

- a chain 22 meshing with a gear 18 fitted to the axial end of shaft 17, and with a gear 23 fitted to shaft 21 in the space between walls 12;
- a chain 24 meshing with a gear 25 fitted to the axial end of shaft 21 outside wall 12, and with a gear 26 fitted to the axial end, outside wall 12, of hub 13 of roller 3a;
- a chain 27 meshing with a gear 28 fitted to the axial end, outside wall 12, of hub 13 of roller 3a, and with a gear 31 fitted to the axial end, outside wall 12, of hub 13 of roller 3b;
- a chain 32 meshing with a gear 33 fitted to the axial end, outside wall 12, of hub 13 of roller 3b, and with a gear 34 fitted to the axial end, outside wall 12, of hub 13 of roller 3c; and
- a chain 35 meshing with a gear 36 fitted to the axial end, outside wall 12, of hub 13 of roller 3c, and with a gear 37 fitted to the axial end, outside wall 12, of hub 13 of roller 3d.

Figure 4:
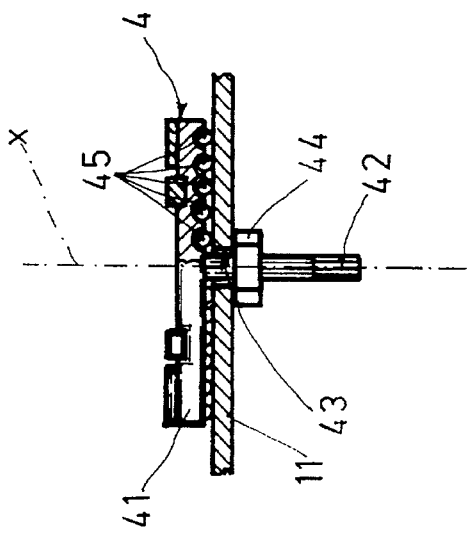
FIG. 4 shows a larger-scale section of a detail of the FIG. 1 truck.

With reference to FIGS. 1, 2 and 4, platform 4 comprises:

- a rectangular plate 41 fitted to the front portion of bed 2;
- a rotary shaft 42 of axis X, extending downwards from the central portion of the bottom face of plate 41 and through a hole 43 formed in wall 11;
- a nut 44 screwed to a threaded portion defined along shaft 42 and beneath hole 43; and
- a number of balls 45 on the bottom face of plate 41 and contacting the top face of wall 11.

In actual use, nut 44 prevents shaft 42 from withdrawing from hole 43, while balls 45 constitute a bearing between plate 41 and wall 11, for permitting rotation of plate 41 about axis X with no noticeable friction due to the weight of the machine being carried. In use, the top face of plate 41 is fitted with means for fastening the machine to plate 41.

With reference to FIGS. 1, 2 and 3, steering device 6 of truck 1 comprises two mutually connected cylindrical bars 51 and 52. Bar 51 comprises a horizontal portion 51a parallel to axis Y and fitted to the bottom face of the rear portion of wall 11, and a hollow portion 51b extending obliquely upwards; and bar 52 comprises a portion 52a coaxial with portion 51b, and a horizontal portion 52b forming the handgrip of device 6. The free end of portion 52a mechanically engages the end of portion 51b.

With reference to FIGS. 1, 2 and 3, means 7 for controlling drive means 5 comprise a control unit 54 fitted to bed 2 and for controlling operation of motor 15; and a pushbutton panel 55 fitted to portion 52b of bar 52 and by which control signals are transmitted to control unit 54. Control unit 54 is cable connected (not shown) to the electricity mains and provides for electrically supplying motor 15; and panel 55 comprises forward, reverse and stop buttons.

Figure 5:
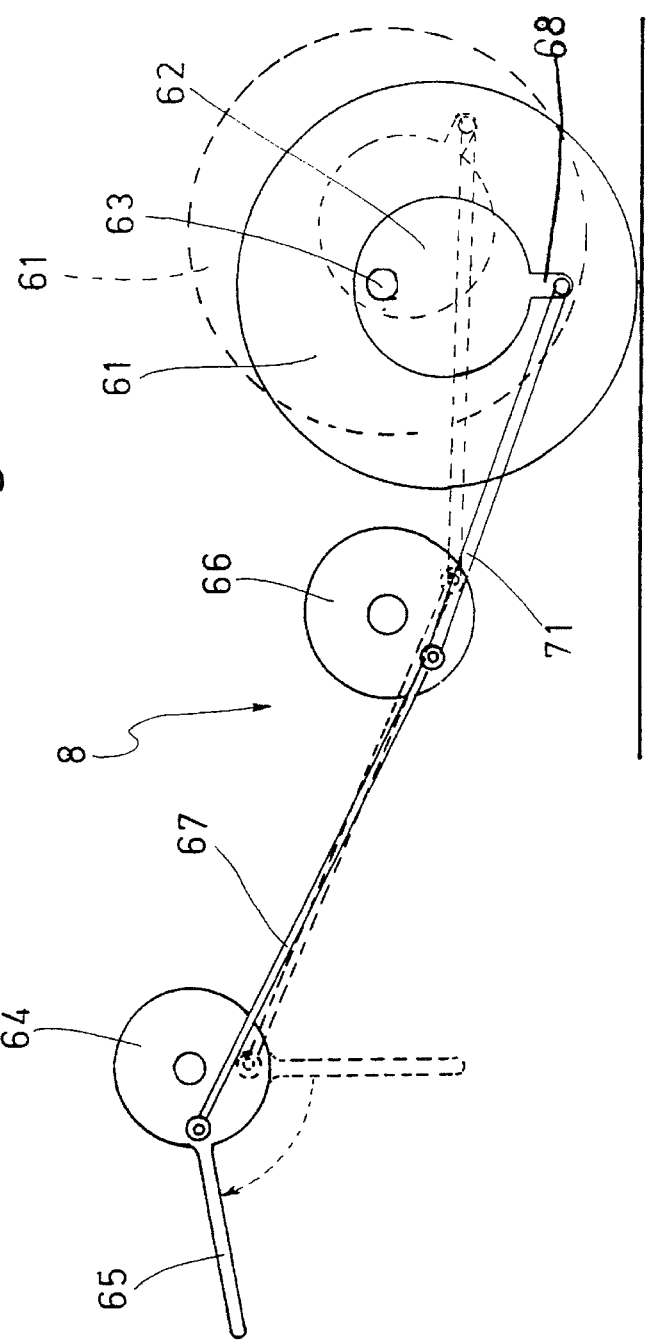
FIG. 5 shows a diagram of the FIG. 1 truck transmission.

With reference to FIGS. 1, 3 and 5, system 8 comprises two wheels 61 made preferably of nylon and fitted idly to the same hub 62, all beneath the rear portion of wall 11; and two pins 63, fitted to walls 12, extend from the ends of and eccentrically in relation to hub 62. System 8 also comprises a manually controlled two-position mechanism, in a first position of which (shown by the dotted line in FIG. 5) wheels 61 are raised off the floor, and in a second position of which hub 62 is rotated about the axis of pins 63 so that wheels 61 rest on the floor.

Said mechanism of system 8 comprises:

a disk 64 fitted to portion 51b of bar 51 and rotating about a horizontal axis;

a hand lever 65 fitted to disk 64 and for setting disk 64 to two different angular positions;

a disk 66 fitted to portion 51a of bar 51 and rotating about a horizontal axis;

a lever 67 hinged at a first end to the rim of disk 64, and at a second end to the rim of disk 66;

an arm 68 extending radially from hub 62; and a lever 71 hinged at a first end to the pivot of lever 67 and disk 66, and at a second end to the free end of arm 68.

System 8 also comprises a small wheel, preferably a castor, 72 fitted to portion 51a of bar 51.

In actual use, to prevent the unloaded truck 1 from being operated by drive means 5, lever 65 is operated to lower wheels 61 on to the floor, and device 6 is pushed down to raise rollers 3a, 3b, 3c, 3d off the floor and at the same time lower wheel 72 on to the floor.

From the central portion of bed 2, there extends upwards a vertical upright 73 presenting an eye 74 for attaching the arm of a crane for lifting truck 1.

The advantages of the present invention will be clear from the foregoing description.

In particular, it provides for a hand truck enabling in-plant transfer of even heavy machinery with no effort required on the part of the user. When loaded, the truck is started and stopped easily by simply pressing a button, and is steered by simply pushing device 6 in the required direction with no particular effort required. When cornering, the machine being carried obviously tends to continue moving in the original direction. By virtue, however, of the machine resting on a platform rotatable about a vertical axis, the platform and hence the machine rotate when cornering, thus making steering easier and preventing rollover of the truck and collapse of the machine off the truck. The ample size of the front portion of the bed and hence the floor area supporting rollers 3a, 3b, 3c, 3d, and installation of drive means 5 on the rear portion of the truck provide for effective weight distribution and so preventing tipping of the truck without affecting its maneuverability. Moreover, the truck features a system for raising rollers 3a, 3b, 3c, 3d off the floor, and simultaneously lowering idle wheels on to the floor for enabling the truck to be pushed by hand when unloaded; the truck is of straightforward design and therefore cheap to produce; and using nylon provides for reducing the wear of rollers 3a, 3b, 3c, 3d and wheels 61.

Clearly, changes may be made to truck 1 as described and illustrated herein without, however, departing from the scope of the present invention.

In particular, device 6 may be provided, between portions 51b and 52a, with a member for adjusting the overall length of device 6; changes may be made to the transmission between drive means 5 and rollers 3a, 3b, 3c, 3d; and the number of rollers 3a, 3b, 3c, 3d may be other than as described and illustrated herein.

I claim:

1. A hand truck for transporting heavy machinery, comprising:

a bed for supporting a machine and including a number of revolving rollers by which the bed rests on the floor;

a drive means fitted to the bed for controlling rotation of said rollers and hence travel of the truck;

a steering device for controlling the travel direction of the truck;

means for controlling said drive means; and a platform supported on the bed for rotation around a vertical axis, and on which the machine rests, wherein said rollers are fitted to a front portion of the bed and said drive means is fitted to a rear portion of the bed, and wherein said bed comprises a horizontal, substantially rectangular wall having longer and shorter sides and two small lateral walls extending downwards from the longer sides of said horizontal wall said lateral walls being spaced apart by a distance equal to the length of the shorter sides of said horizontal wall, said rollers being fitted beneath said horizontal wall, being shorter than the distance between said lateral walls, and being fitted to respective rotary hubs supported by and extending beyond said lateral walls.

2. A truck as claimed in claim 1, wherein said rollers are made of nylon.

3. A truck as claimed in claim 1, wherein said drive means comprises an electric motor and a motor reducer for transmitting drive from said motor to a horizontal first shaft extending perpendicularly to a longitudinal axis of the bed, a second rotary shaft extending parallel to said first shaft and beneath said horizontal wall, said lateral walls supporting said second rotary shaft, said second rotary shaft having axial ends which extend beyond said lateral walls.

4. A truck as claimed in claim 3, further comprising two transmission systems for transmitting drive between said motor and said rollers, said transmission systems being symmetrical in relation to said longitudinal axis of the bed.

5. A truck as claimed in claim 4, wherein each said transmission system comprises:

a first chain meshing with a first gear fitted to an axial end of said first shaft, and with a second gear fitted to a portion of said second shaft defined between said lateral walls;

a second chain meshing with a third gear fitted to an axial end of said second shaft outside said lateral wall, and with a fourth gear fitted to an axial end, outside said lateral wall, of said hub of a first of said rollers;

a third chain meshing with a fifth gear fitted to the axial end, outside said lateral wall, of said hub of said first roller, and with a sixth gear fitted to an axial end, outside said lateral wall, of said hub of a second of said rollers;

a fourth chain meshing with a seventh gear fitted to the axial end, outside said lateral wall, of said hub of said second roller, and with an eighth gear fitted to an axial end, outside said lateral wall, of said hub of a third of said rollers; and a fifth chain meshing with a ninth gear fitted to the axial end, outside said lateral wall, of said hub of said third roller, and with a tenth gear fitted to an axial end, outside said lateral wall, of said hub of a fourth of said rollers.

6. A truck as claimed in claim 1, wherein said platform comprises:

a rectangular plate fitted to the front portion of said bed;

a third shaft rotating about said vertical axis, extending from a central portion of a bottom face of said rectangular plate, and extending downwards beyond said horizontal wall and through a hole formed in said horizontal wall;

means for fastening said third shaft to said bed; and bearing means between the bottom face of said plate and a top face of said horizontal wall.

7. A truck as claimed in claim 1, wherein said steering device comprises a bar including a horizontal first portion fitted to the rear portion of said horizontal wall, a second portion extending obliquely upwards, and a horizontal third portion forming a handgrip of said steering device.

8. A truck as claimed in claim 7, wherein said bar is formed in two parts connected to each other by a member permitting adjustment of total length of the bar.

9. A truck as claimed in claim 3, wherein said means for controlling said drive means comprises a control unit fitted to said bed for controlling operation of said drive means and a pushbutton panel fitted to said steering device and by which control signals are transmitted to said control unit, said pushbutton panel comprising a forward travel control button, a reverser travel control button, and a stop button.

10. A truck as claimed in claim 1, further comprising a system for raising said rollers off the floor to permit manual operation of the truck when unloaded, and which includes:

a small wheel fitted idly to said steering device;

two idle wheels fitted idly to a common hub, and all fitted beneath the rear portion of said horizontal wall;

two pins fitted to said lateral walls and extending eccentrically from axial ends of said common hub; and a manually controlled, two-positioned mechanism, in a first position of which said two idle wheels are raised off the floor, and in a second position of which said common hub fitted with said idle wheels is rotated about an axis passing through said pins so as to lower said idle wheels on to the floor, whereby by pushing said steering device downwards, said rollers are raised off the floor and, at the same time, said small wheel and said idle wheels are lowered on to the floor.

* * * * *